(12) United States Patent
Kadam et al.

(10) Patent No.: US 11,314,746 B2
(45) Date of Patent: Apr. 26, 2022

(54) PROCESSING UNSTRUCTURED DATA STREAMS USING CONTINUOUS QUERIES

(71) Applicant: Vocus NM LLC, Beltsville, MD (US)

(72) Inventors: Rajeev Anand Kadam, San Jose, CA (US); Georgy Balayan, Burlingame, CA (US); Vishal Harshvardhan Sankhla, Santa Clara, CA (US); Shrikar Archak, San Jose, CA (US)

(73) Assignee: CISION US INC., Wilmington, DE (US)

( * ) Notice: Subject to any disclaimer, the term of this patent is extended or adjusted under 35 U.S.C. 154(b) by 1248 days.

(21) Appl. No.: 14/189,863

(22) Filed: Feb. 25, 2014

(65) Prior Publication Data

US 2014/0280313 A1 Sep. 18, 2014

Related U.S. Application Data

(60) Provisional application No. 61/792,586, filed on Mar. 15, 2013.

(51) Int. Cl.
*G06F 16/2455* (2019.01)
(52) U.S. Cl.
CPC .............. *G06F 16/24568* (2019.01)
(58) Field of Classification Search
CPC .............. G06F 17/3061; G06F 17/30516
USPC ..................................................... 707/769
See application file for complete search history.

(56) References Cited

U.S. PATENT DOCUMENTS

| | | | |
|---|---|---|---|
| 7,207,011 B2 | 4/2007 | Mulvey et al. |
| 7,603,350 B1 | 10/2009 | Guha |
| 7,756,755 B2 | 7/2010 | Ghosh et al. |
| 7,873,638 B2 | 1/2011 | Young et al. |
| 8,086,440 B2 | 12/2011 | Elliot et al. |
| 8,140,335 B2 | 3/2012 | Kennewich et al. |
| 8,145,910 B1 | 3/2012 | Gupta et al. |
| 8,204,884 B2 | 6/2012 | Freedman et al. |
| 8,250,096 B2 | 8/2012 | Su et al. |
| 8,473,624 B2 | 6/2013 | Mart et al. |
| 8,631,122 B2 | 1/2014 | Kadam et al. |
| 8,635,227 B2 | 1/2014 | Sankhla et al. |
| 8,731,901 B2 | 5/2014 | Srihari et al. |
| 9,076,125 B2 | 7/2015 | Manolescu et al. |
| 9,514,435 B2 | 12/2016 | Nguyen |

(Continued)

OTHER PUBLICATIONS

U.S. Appl. No. 14/138,718; Office Action dated Nov. 7, 2014.

(Continued)

*Primary Examiner* — Boris Gorney
(74) *Attorney, Agent, or Firm* — Polsinelli LLP

(57) ABSTRACT

Systems and methods for continuous processing of unstructured data streams are provided. Information may be stored in memory regarding a query, including associated search results and statistics derived at an identified time. After the identified time, unstructured data may be received from a plurality of streams over a communication network. A full-text search may be conducted on the received unstructured data based on the query to yield one or more matches. The stored statistics associated with the query may be retrieved from memory and updated based on the search results of the unstructured data received at the subsequent time. The updated statistics may then be stored in memory for retrieval at a subsequent time.

14 Claims, 2 Drawing Sheets

(56) References Cited

U.S. PATENT DOCUMENTS

| | | |
|---|---|---|
| 10,162,891 B2 | 12/2018 | Kadam |
| 10,185,754 B2 | 1/2019 | Sankhla |
| 2004/0088210 A1 | 5/2004 | Tsyganskiy |
| 2005/0108017 A1 | 5/2005 | Esser et al. |
| 2006/0020662 A1 | 1/2006 | Robinson |
| 2006/0242126 A1 | 10/2006 | Fitzhugh |
| 2006/0249576 A1 | 11/2006 | Nakada et al. |
| 2006/0253316 A1 | 11/2006 | Blackshaw et al. |
| 2007/0271234 A1 | 11/2007 | Ravikiran |
| 2007/0294240 A1 | 12/2007 | Steele et al. |
| 2008/0059282 A1 | 3/2008 | Vallier et al. |
| 2008/0114737 A1 | 5/2008 | Neely et al. |
| 2008/0147487 A1 | 6/2008 | Hirshberg |
| 2008/0208820 A1* | 8/2008 | Usey ................. G06F 17/30616 |
| 2008/0215607 A1 | 9/2008 | Kaushansky et al. |
| 2008/0221892 A1 | 9/2008 | Nathan et al. |
| 2009/0119173 A1 | 5/2009 | Parsons et al. |
| 2009/0119324 A1 | 5/2009 | Simard et al. |
| 2009/0157482 A1 | 6/2009 | Jung et al. |
| 2009/0164926 A1 | 6/2009 | Boyle et al. |
| 2009/0327120 A1 | 12/2009 | Eze et al. |
| 2010/0042470 A1 | 2/2010 | Chang et al. |
| 2010/0114654 A1 | 5/2010 | Lukose et al. |
| 2010/0114935 A1 | 5/2010 | Polo-Malouvier et al. |
| 2010/0119053 A1* | 5/2010 | Goeldi .................. G06Q 10/00 379/265.09 |
| 2010/0174813 A1 | 7/2010 | Hildreth et al. |
| 2010/0198757 A1 | 8/2010 | Cheng et al. |
| 2010/0287049 A1 | 11/2010 | Rousso et al. |
| 2010/0293566 A1 | 11/2010 | Valdez |
| 2011/0022621 A1 | 1/2011 | Luo et al. |
| 2011/0055017 A1 | 3/2011 | Solomon et al. |
| 2011/0055196 A1 | 3/2011 | Sundelin et al. |
| 2011/0055264 A1 | 3/2011 | Sundelin et al. |
| 2011/0055336 A1 | 3/2011 | Park et al. |
| 2011/0078173 A1 | 3/2011 | Seligmann et al. |
| 2011/0082824 A1 | 4/2011 | Allison et al. |
| 2011/0145052 A1 | 6/2011 | Lin et al. |
| 2011/0191372 A1 | 8/2011 | Kaushansky et al. |
| 2012/0030210 A1 | 2/2012 | Sankhla |
| 2012/0047219 A1 | 2/2012 | Feng et al. |
| 2012/0110071 A1 | 5/2012 | Zhou et al. |
| 2012/0136959 A1 | 5/2012 | Kadam |
| 2012/0197852 A1* | 8/2012 | Dutta .................. H04L 67/2804 707/692 |
| 2012/0197911 A1* | 8/2012 | Banka ............... G06F 17/30864 707/752 |
| 2012/0197934 A1* | 8/2012 | Zhang ............... G06F 17/30516 707/770 |
| 2012/0291070 A1* | 11/2012 | Feng .............. H04N 21/234336 725/40 |
| 2013/0014141 A1* | 1/2013 | Bhatia .................. H04N 21/252 725/10 |
| 2013/0254205 A1 | 9/2013 | Boyle et al. |
| 2014/0040281 A1* | 2/2014 | Spivack .............. G06F 17/3053 707/748 |
| 2014/0114959 A1 | 4/2014 | Sankla |
| 2014/0114998 A1 | 4/2014 | Kadam |

OTHER PUBLICATIONS

U.S. Appl. No. 14/138,718; Final Office Action dated Jun. 10, 2015.
U.S. Appl. No. 14/138,731; Office Action dated Aug. 13, 2015.
U.S. Appl. No. 14/138,718; Office Action dated Mar. 4, 2016.
U.S. Appl. No. 14/138,731; Final Office Action dated Mar. 24, 2016.
U.S. Appl. No. 12/889,267; Office Action dated Dec. 17, 2012.
U.S. Appl. No. 12/955,899; Final Office Action dated Sep. 12, 2013.
U.S. Appl. No. 12/955,899; Office Action dated Nov. 19, 2012.
U.S. Appl. No. 14/138,718, Vishal Harshvardhan Sankhla, Discerning Human Intent Based on User-Generated Metadata, filed Dec. 23, 2013.
U.S. Appl. No. 14/138,731, Rajeev Anand Kadam, Discerning Demographics Based on User Interaction, filed Dec. 23, 2013.
U.S. Appl. No. 14/138,718; Final Office Action dated Dec. 14, 2016.
U.S. Appl. No. 14/138,731; Final Office Action dated Dec. 28, 2016.
U.S. Appl. No. 14/138,731; Office Action dated Nov. 30, 2017.
U.S. Appl. No. 14/138,718; Office Action dated Jul. 13, 2017.

* cited by examiner

PROCESSING UNSTRUCTURED DATA STREAMS USING CONTINUOUS QUERIES

CROSS-REFERENCE TO RELATED APPLICATIONS

The present patent application claims the priority benefit of U.S. provisional patent application No. 61/792,586, filed on Mar. 15, 2013, the disclosure of which is incorporated herein by reference.

BACKGROUND OF THE INVENTION

1. Field of the Invention

The present invention generally relates to data statistics. More specifically, the present invention relates to processing streams using continuous queries.

2. Description of the Related Art

Historically, databases have been used to store highly structured data. For example, an airline reservation system (ARS) stores information about booked tickets, users, and relationships between them using a well-defined relational database. The format of each entity generally would not change much throughout its lifetime. Relational Database Management Systems (RDMS) have generally been used for storing and processing structured data. A specialized language—Structured Query Language (SQL)—has been developed for use in processing data stored in the RDMSs.

In recent years, the appearance and rapid adoption by users of various social networks has resulted in an exponential growth in the amount of data generated by users. Users continuously produce massive volumes of data when posting pictures to Instagram or Facebook, posting tweets to Twitter, or uploading videos to YouTube. In addition, each outlet may use a different format when storing its users' data in their respective databases. For example, an Instagram photo might have information about its author, photo, and comments, whereas a tweet might have an author, message, retweets, and favorites. Moreover, the format used by each outlet may changes throughout its lifetime. A current Facebook post, for example, may be associated with information about its number of shares, a feature that was not supported in earlier versions of Facebook.

Such drastic and rapid changes in the amount and variety of data prompted the creation of new types of data processing systems (e.g., systems based on the MapReduce paradigm). Hadoop MapReduce is a leading implementation of the MapReduce processing model. Hadoop MapReduce has been a good fit for large-scale batch processing solutions, where a group of data elements have to be collected and organized into batches. The main drawback of this approach is that batch processing cannot guarantee real-time performance, because a large amount of data needs to be collected before moving to the processing stage.

As such, while there are RDBMs and batch-processing frameworks that can process and store large volumes of data, these solutions may not be robust enough to handle massive and continuous streams of unstructured data in real-time. Traditional relational tables are not flexible enough for storing large amounts of irregular data. None of these solutions is capable of delivering real-time performance statistics.

There is therefore a need in the art for an improved data processing framework that can handle large volumes of unstructured streamed data in real-time.

SUMMARY OF THE CLAIMED INVENTION

Embodiments of the present invention provide systems and methods for continuous processing of unstructured data streams. Information may be stored in memory regarding a query, including associated search results and statistics derived at an identified time. After the identified time, unstructured data may be received from a plurality of streams over a communication network. A full-text search may be conducted on the received unstructured data based on the query to yield one or more matches. The stored statistics associated with the query may be retrieved from memory and updated based on the search results of the unstructured data received at the subsequent time. The updated statistics may then be stored in memory for retrieval at a subsequent time.

Embodiments of the present invention include methods for continuous processing of unstructured data streams. Such methods may include storing information in memory regarding a query associated with search results and statistics derived at an identified time, receiving unstructured data from a plurality of streams over a communication network after the identified time, conducting a full-text search of the received unstructured data based on the query to yields one or more matches, retrieving the stored statistics associated with the query that were derived at the identified time, and updating the associated statistics based on search results of the unstructured data received at the subsequent time. The method may further include storing the updated statistics in memory for retrieval at a subsequent time based on subsequently arriving data.

Various embodiments of the present invention further include systems for continuous processing of unstructured data streams. Such systems may include memory for storing information regarding a query associated with search results and statistics derived at an identified time and a communication interface for receiving unstructured data from a plurality of streams over a communication network after the identified time. Systems may further include a processor for executing instructions stored in memory to conduct a full-text search of the received unstructured data based on the query to yields one or more matches, retrieve the statistics that were derived at the identified time, and update the associated statistics based on search results of the unstructured data received at the subsequent time. The updated statistics may then be stored in memory for retrieval at a subsequent time.

Other embodiments of the present invention include non-transitory computer-readable storage media on which is embodied instructions executable to perform a method for continuous processing of unstructured data streams as previously set forth above.

DETAILED DESCRIPTION

Embodiments of the present invention provide methods for continuous processing of unstructured data streams. For example, if a user needs to count the number of times the specific keyword is mentioned on twitter on the daily basis, the stream of tweets should be constantly directed into the full-text search engine. Once indexed, the tweets will be retrieved from the full-text search engine by matching it with a query continuously executed by the analytics engine.

Next, the analytics engine will increase the corresponding to the keyword counter by the number of new messages matched with the query. Finally, the new value of the counter will be stored in the statistics numbers storage module.

Figure 1:
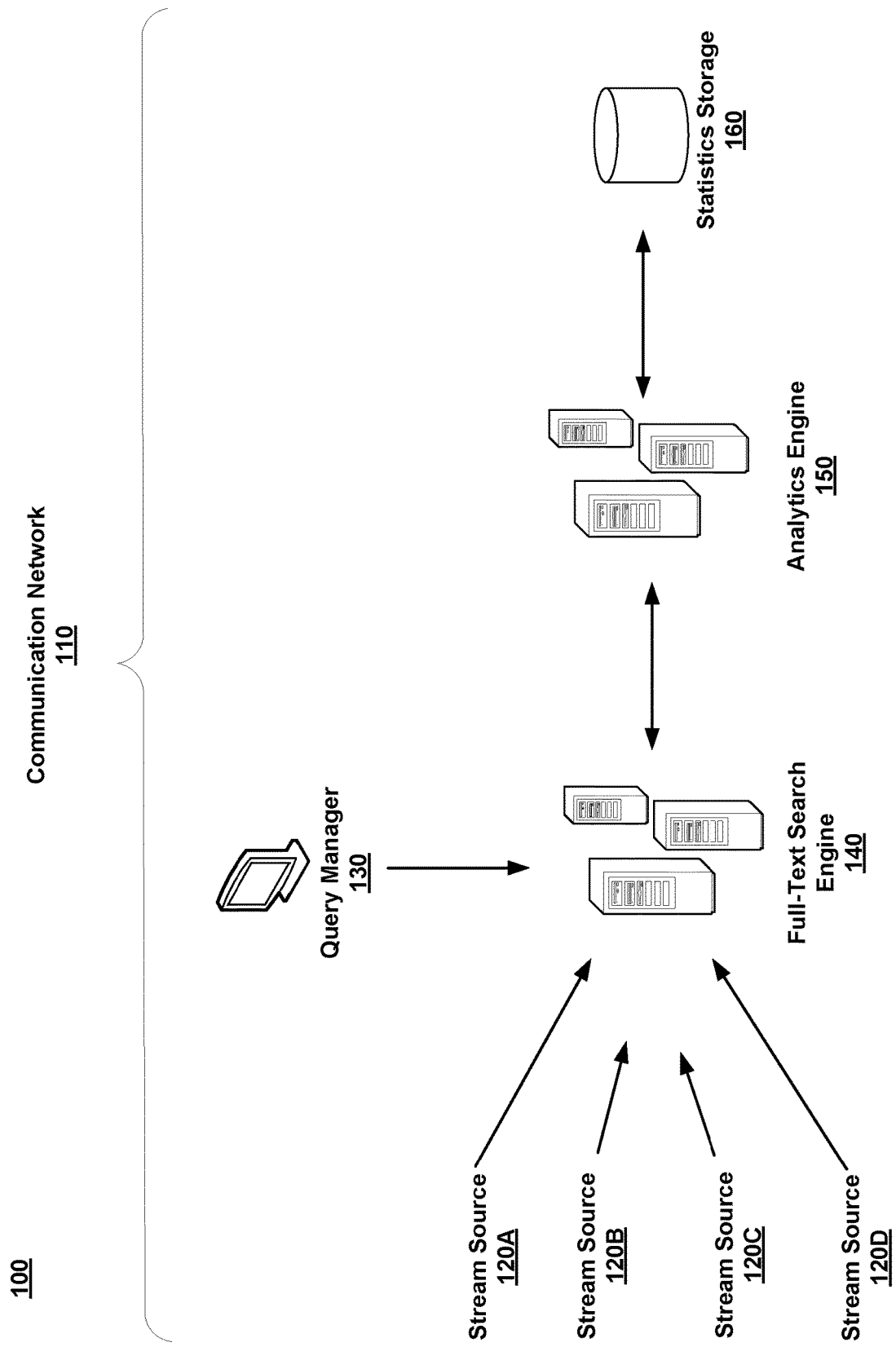
FIG. 1 is an exemplary network environment in which the claimed system for continuous processing of unstructured data streams may be implemented.

FIG. 1 illustrates an exemplary network environment 100 in which the claimed system for continuous processing of unstructured data streams may be implemented. The different component in network environment 100 may use communication network 110 to communicate with each other. System architecture 100 may further include a stream sources 120A-D, which continuously streams data into a full-text search engine 140. The full-text search engine 140 indexes the data in real-time and matches the data with one or more keywords identified by a query from query manager 130. An analytics engine 150 receives the indexed data streams that corresponds to the query, and retrieves previous statistics regarding the query from a statistics storage 160. The statistics regarding the query may be updated by analytics engine 150 and stored back in statistics storage 160 for subsequent retrieval and updates.

Communication network 110 may be inclusive of any local, proprietary network (e.g., an intranet), as well as any larger wide-area network. The communications network 110 may include a local area network (LAN), for example, which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of digital environment 100.

Stream sources 120A-D may comprise streams of data from any social network, social sharing, or other publication by which users generate data. Various modern blogging, micro-blogging, and other content generation applications and tools allow users to create and share large quantities of data with the public. Such data may include textual information (e.g., status updates, hyperlinks, bookmarks, blogs, microblogs, tweets, forum posts), photos, and video, as well as related follow-on content related to the same (e.g., descriptions, comments). As noted previously, because of the variety of possible outlets that users can use to publish their content, the data from each different stream source 120 may be structured differently. As users around the world are continuously publishing content via such outlets, stream sources 120A-D are likewise continuously generating massive amounts of data.

Entities (user or machine) may submit queries to query manager 130 to obtain search results and statistics about the data from stream sources 120A-D. Each query may identify one or more keywords of interest. In addition, a query may be expressed as a Boolean to ensure inclusion or exclusion of certain keywords. In addition of defining the keywords of interest, the user may further provide additional query attributes. Alternatively, the query manager 130 may identify certain query attributes automatically and associate the identified attributes with the query. Such query attributes may include criteria governing the application of the query to the full-text database.

Full-text search engine 140 applies the queries from query manager 130 in real-time and create indexes from the continuous streams of data from stream sources 120A-D. The keywords from the queries managed by query manager 130 may be used to index the incoming data from stream sources 120A-D. As such, the full-text search engine 140 may be able to determine whenever there are matches to the keywords in real-time as the data from stream sources 120A-D are received.

The analytics engine 150 may utilize natural language processing (NLP), artificial intelligence (AI), and linear algebra to compute various statistics regarding query search results (matches). For example, a user may query for a list of the most positively retweeted tweets that mentions a specific keyword. The full-text search engine 140 may first index streamed data based on the keyword. Then, once the matching tweets have been identified by full-text search engine 140, the analytics system 150 may tag each tweet with an associated sentiment that has been identified. Subsequently, the negative tweets may be filtered out of the set of matching tweets. Remaining messages may then be ranked by their number of retweets. The resulting list may be merged with a stored list of the top positive mentions for the keyword thus far. The merged list may then be stored in the statistics storage 160, which may be one or more databases as known in the art for storing data.

The aforementioned use cases may apply when a user needs to see statistics on a daily basis (e.g., statistics provided for specific days). Alternatively, users may request statistics over larger time periods. For example, a user might request a list of top positive mentions for the last week, or the last month. The straightforward solution would be to compute the statistics for any number of days, based on the already computed daily statistics. In practice, users may want to see dozens of different statistics across extended time spans, which will make the data aggregation operation extremely computationally expensive. In order to significantly speed up the data aggregation operation, the analytical engine may compute data for rolling 1-day, 7-day, and 30-day time periods. In this case, the pre-computed statistics will cover the most frequent use cases, and statistics for any other time range can be represented as a linear combination statistics for 1, 7, and 30 days. Such specifications as to time period may be stored as the criteria associated with an associated query.

While various analytics models may be used, one embodiment may use A to represent a set of mentions matched with a complex query expression corresponding to a specific keyword or keywords and use S' to represent the currently stored set of statistics corresponding to the expression. Then, the new statistics S can be computed according to the following formula:

$$S = f(S', A),$$

In the formula above, $f$ represents the stream transformer. The stream transformer computes the new value of statistics based on its current value and a new set of mentions, practically in real-time. For example, the stream transformer could be a sum operation against two scalar values: $f(a, b)$: return (a+b). It is important to note that a stream transformer can be defined extremely broadly in terms of the operation: addition, multiplication, and max to name a few. In addition, the arguments could be simple scalar numbers or any type of maps (e.g., associative arrays), arrays, lists, etc.

Referring to the example provided above regarding the top positive retweets, max may be used as the operation, and a map may be the data type of the arguments. Each mention may have a corresponding item inside the map with a keyword being a unique hashtag for the mention and the value equal to the number of occurrences of the mention. In addition, the mentions may be sorted by their respective values (e.g., number of occurrences of the hashtags) to generate a list of top mentions. For example, the keyword "Apple" may be associated with hashtags such as #iPhone, #iPad, and #Macbook, each associated with a number of occurrences. The hashtag #iPhone may have been mentioned 5000 times, while #iPad was mentioned 300 times and #Macbook mentioned 50 times. As such, the list of top mentions may be ordered with #iPhone first, #iPad second, and #Macbook third based on these numbers, which may be updated as additional data streams are received and processed.

The formula above may be used for computing statistics on the daily basis. The following actions should be performed in order to compute statistics for the N number of days, where N will be either 7 or 30 in this case (N could be any positive integer in the general case):

$$S_N[0] = S_1[0]$$

for $i=1$ to $(n-1)$ $$S_N[0] = f(S_N[0], S_1[i]),$$

Where, $S_M[i]$—is the statistics for an M-day time interval computed for the date i-days ago. Hence, $S_N[0]$ corresponds to the statistics computed over an N-day time range ending today.

For example, if for N=7, the user needs to have the a daily most retweeted post for a keyword, and the number of retweets the top retweeted posts for the past week is as follows: [10, 9, 5, 0, 3, 4, 10]. So, if the number of retweets for the today's top tweet is 8, then $S_7[0]=10$ (max(9, 5, 0, 3, 4, 10, 8)).

A very dramatic improvement could be done for computing the value of $S_N[0]$, if there exists a reverse transformer function $f^1$, such that:

$$f^1(f(a,b),b) = a.$$

In this case, the algorithm above would be transformed this way:

$$S_N[0] = f^1(f(S_N[1], S_1[0]), S_1[N]),$$

It is important to note, that the $f^1$ function is not associative.

For example, if for N=7, the user is tracking a keyword that was mentioned today 100 times ($S_1[0]=100$), and it was mentioned in a week ending yesterday 600 times ($S_7[1]=600$), and it was mentioned 50 times 8 days ago ($S_1[8]=50$), then in order to compute how many times the keyword was mentioned in the 7-day time interval ending today the following formula could be applied:

$$S_7[0] = f^1(f(S_7[1], S_1[0]), S_1[7]),$$

$$S_7[0] = f^1(f(600,100), 50)$$

$$S_7[0] = 600 + 100 - 50$$

$$S_7[0] = 650$$

Figure 2:
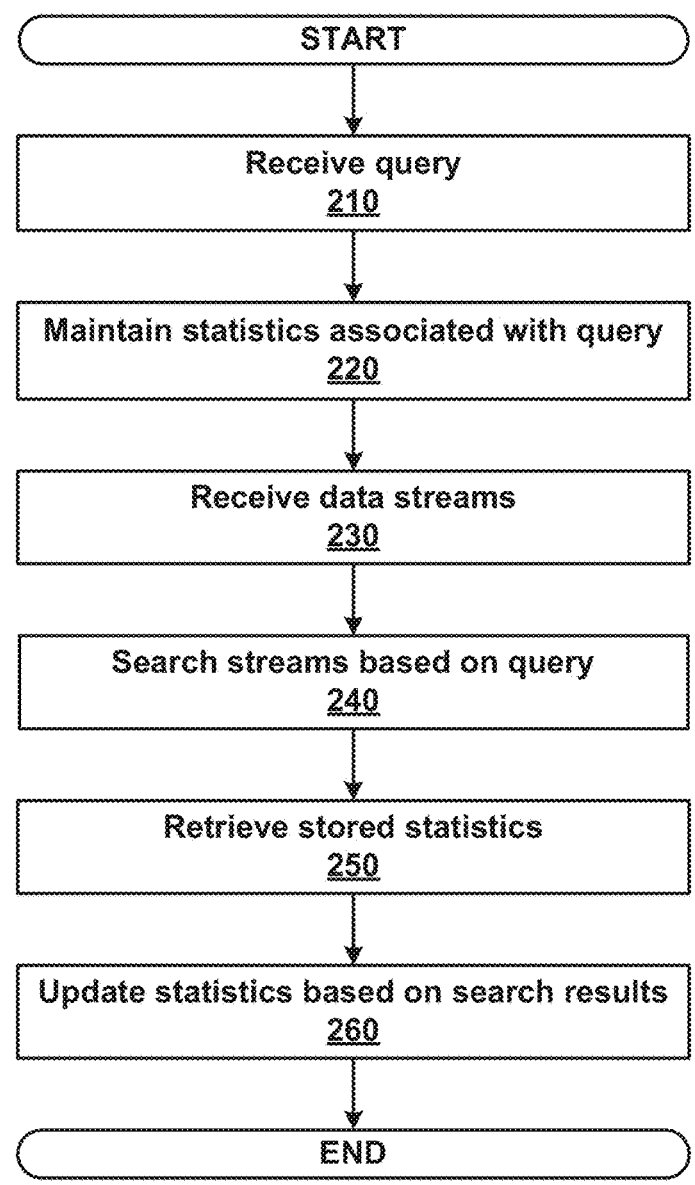
FIG. 2 is a flowchart illustrating an exemplary method for continuous processing of unstructured data streams.

FIG. 2 is a flowchart illustrating an exemplary method for continuous processing of unstructured data streams. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the In method 200 of FIG. 2, information may be stored in memory regarding a query associated with search results and associated statistics derived at an identified time, unstructured data may be received from a plurality of streams over a communication network after the identified time, a full-text search may be conducted of the received unstructured data based on the query that yields one or more matches, statistics that were derived at the identified time may be retrieved, and the associated statistics based on search results of the unstructured data received at the subsequent time may be updated and stored in memory for retrieval at a subsequent time.

In step 210, a query is received at query manager 130 that defines one or more keywords of interest. In some instances, the query may further specify a sentiment of interest, a time period of interest, or a metric of interest. For example, the query may specify an interest in positive tweets regarding Coca-Cola® in the last week that have received the most retweets.

In step 220, statistics may be maintained regarding the query. The query may be applied to a set of data that existed at an identified time, and the analytics and metrics determined based on the results. Such statistics may be maintained in conjunction or separately (e.g., statistics storage 160) from the query. Such statistics, however, may be identified as being associated with the particular query.

In step 230, data from the continuous streams are received from stream source 120A-D at a time after the identified time of step 220 when the stored statistics were derived. As noted above regarding the proliferation of social networks and modern communication tools, users around the world are continuously generating new data.

In step 240, such data may be provided to full-text search engine 140, which identifies any matches to the query received in step 210. In addition, analytics engine 150 may derive or generate statistics (e.g., analytics and metrics of interest) based on the query.

In steps 250 and 260, the statistics generated in step 220 are retrieved from memory and combined with the statistics generated in step 240, which were based on data received subsequent to performance of step 220. As such, the combined statistics reflect a most current set of data and may then be stored for subsequent retrieval.

It is contemplated that the aforementioned method be performed substantially in real-time. In that regard, streams of data may be continuously received, matched to a query, which may then be processed to derive statistics that may be used to update a previous set of statistics associated with the query. As more data is received and new statistics derived, the updated statistics may then be retrieved and updated with a subsequent set of statistics.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for continuous processing of unstructured data streams, the method comprising:
    storing information in memory regarding an entity and an entity-specific query to be continuously applied, wherein the entity-specific query is associated with search results for one or more specified keywords in a context indicative of a specified sentiment and associated statistics derived at an identified time;
    receiving unstructured data from a plurality of different continuous streams from different stream sources over a communication network, wherein the unstructured data is received a subsequent time after the identified time; and
    executing instructions stored in memory, wherein execution of the instructions by a processor:
        filters the received unstructured data based on entity-specific query, wherein filtering the received unstructured data comprises conducting a full-text search of the received unstructured data based on the keywords specified by the entity-specific query, and filtering results of the conducted search to yield one or more matches responsive to the sentiment specified by the entity-specific query,
        retrieves the statistics that were derived at the identified time based on analytics for the matches responsive to the entity-specific query,
        updates the associated statistics for the unstructured data received at the subsequent time, wherein the updated associated statistics are based on filtering the unstructured data received at the subsequent time based on the entity-specific query, and
        indexes the unstructured data from the plurality of different continuous streams from the different stream sources based on the keywords specified by the entity-specific query, wherein the indexed data is tagged based on the sentiment specified by the entity-specific query, and wherein the indexed data and the associated updated statistics are merged and stored in memory for retrieval in association with the entity and a time period after the identified time.

2. The method of claim 1, wherein the entity-specific query is continuously applied to the unstructured data in real-time, and wherein the unstructured data is indexed in real-time and associated with the entity.

3. The method of claim 1, wherein the entity-specific query identifies a period of time of interest to the entity.

4. The method of claim 1, wherein the entity-specific query is associated with a predetermined period of interest to the entity.

5. The method of claim 1, wherein the entity-specific query further specifies a metric of interest to the entity.

6. The method of claim 1, wherein the tag is further based on the identified context of interest to the entity.

7. The method of claim 1, further comprising filtering the indexed data based on the tag.

8. The method of claim 7, further comprising merging the filtered data with a stored list of previously filtered data to generate a new list, wherein the new list is stored in association with the entity and the identified time.

9. A system for continuous processing of unstructured data streams, the system comprising:
    memory for storing information regarding an entity and an entity-specific query to be continuously applied, wherein the query is associated with search results for one or more specified keywords in a context indicative of a specified sentiment and associated statistics derived at an identified time;
    a communication interface for receiving unstructured data from a plurality of different continuous streams from different stream sources over a communication network, wherein the unstructured data is received at a subsequent after the identified time; and
    a processor for executing instructions stored in memory, wherein execution of the instructions by a processor:
        filters the received unstructured data based on entity-specific query, wherein filtering the received unstructured data comprises conducting a full-text search of the received unstructured data based on the keywords specified by the entity-specific query, and filtering results of the conducted search to yield one or more matches responsive to the sentiment specified by the entity-specific query,
        retrieves the statistics that were derived at the identified time based on analytics for the matches responsive to the entity-specific query,
        updates the associated statistics for the unstructured data received at the subsequent time, wherein the updated associated statistics are based on filtering the unstructured data received at the subsequent time based on the sentiment specified by the entity-specific query, and
        indexes the unstructured data from the plurality of different continuous streams from the different stream sources based on the keywords specified by the entity-specific query, wherein the indexed data is tagged based on the sentiment specified by the entity-specific query, wherein memory stores the indexed data merged with the associated updated statistics for retrieval in association with the entity and a time period after the identified time.

10. The system of claim 9, wherein the entity-specific query is continuously applied to the unstructured data in real-time, and wherein the unstructured data is indexed in real-time and associated with the entity.

11. The system of claim 9, wherein the entity-specific query identifies a period of time of interest to the entity.

12. The system of claim 9, wherein the entity-specific query is associated with a predetermined period of interest to the entity.

13. The system of claim 9, wherein the entity-specific query further specifies a metric of interest to the entity.

14. A non-transitory computer-readable storage medium, having embodied thereon a program executable by a processor to perform a method for continuous processing of unstructured data streams, the method comprising:

storing information in memory regarding an entity and an entity-specific query to be continuously applied, wherein the entity-specific query is associated with search results for one or more specified keywords in a context indicative of a specified sentiment and associated statistics derived at an identified time;

receiving unstructured data from a plurality of different continuous streams from different stream sources over a communication network, wherein the unstructured data is received at a subsequent time after the identified time;

filtering received unstructured data based on entity-specific query, wherein filtering the received unstructured data comprises conducting a full-text search of the received unstructured data based on the keywords specified by the entity-specific query, and filtering results of the conducted search to yield one or more matches responsive to the sentiment specified by the entity-specific query;

retrieving the statistics that were derived at the identified time based on analytics for the matches responsive to the entity-specific query;

updating the associated statistics for the unstructured data received at a subsequent time, wherein the updated associated statistics are based on filtering the unstructured data received at the subsequent time based on the entity-specific query; and indexing the unstructured data from the plurality of different streams from the different stream sources based on the keywords specified by the entity-specific query, wherein the indexed data is tagged based on the sentiment specified by the entity-specific query, and wherein the indexed data and the associated updated statistics are merged and stored in memory for retrieval in association with the entity and a time period after the identified time.

* * * * *